US012705629B2

(12) United States Patent
Pande et al.

(10) Patent No.: US 12,705,629 B2
(45) Date of Patent: Aug. 11, 2026

(54) DCF-DRIVEN AUDIT AND COMPLIANCE REPORTING

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/746,512

(22) Filed: Jun. 18, 2024

(65) Prior Publication Data

US 2025/0384450 A1 Dec. 18, 2025

(51) Int. Cl.
*G06Q 30/018* (2023.01)
*G06F 21/57* (2013.01)
*G06F 21/64* (2013.01)

(52) U.S. Cl.
CPC .......... *G06Q 30/018* (2013.01); *G06F 21/57* (2013.01); *G06F 21/64* (2013.01)

(58) Field of Classification Search
None
See application file for complete search history.

(56) References Cited

U.S. PATENT DOCUMENTS 11,108,891 B1 * 8/2021 Todd .................. H04L 67/1044
11,544,253 B2 * 1/2023 Todd .................. G06F 16/2379
11,599,522 B2 * 3/2023 Todd .................. G06F 16/2365
11,824,883 B2 * 11/2023 Todd .................. H04L 63/1433
12,423,081 B2 * 9/2025 Pande ...................... G06F 8/65
12,489,753 B2 * 12/2025 Pande ................ H04L 12/4641
12,513,197 B2 * 12/2025 Pande .................... H04L 63/20
12,518,014 B2 * 1/2026 Reineke ................. G06F 21/57
2017/0308807 A1 * 10/2017 Hauth .................... G06Q 10/40
2020/0106803 A1 * 4/2020 Schwartz ........... H04W 12/086
2021/0034382 A1 * 2/2021 Todd ..................... H04L 9/3247
2021/0117128 A1 * 4/2021 Todd ....................... G06F 3/067
2021/0124727 A1 * 4/2021 Todd .................. G06F 16/2237
(Continued)

OTHER PUBLICATIONS

C. Adam, M. F. Bulut, M. Hernandez and M. Vukovic, "Cognitive Compliance: Analyze, Monitor and Enforce Compliance in the Cloud," 2019 IEEE 12th International Conference on Cloud Computing (CLOUD), Milan, Italy, 2019, pp. 234-242, doi: 10.1109/CLOUD.2019.00049. (Year: 2019).*

*Primary Examiner* — Jonathan Ng
(74) *Attorney, Agent, or Firm* — Workman Nydegger

(57) ABSTRACT

One example method includes receiving, from a DCF (data confidence fabric) including a node that comprises a data source of an edge environment, a confidence score concerning a data stream associated with the data source, correlating the confidence score to a compliance level of the edge environment with regard to a specified requirement for the edge environment, generating, based on the confidence score and compliance information, an audit report that identifies a connection between the confidence score and the compliance level, and for a value of a performance gap between the compliance level and a required compliance level, associated with the specified requirement, that meets or exceeds a threshold, identifying a remedial action which, when implemented in the edge environment, causes a reduction of the performance gap to a value below the threshold.

20 Claims, 4 Drawing Sheets

(56) References Cited

U.S. PATENT DOCUMENTS

| | | | | |
|---|---|---|---|---|
| 2022/0060323 | A1* | 2/2022 | Payne | H04L 9/0897 |
| 2022/0101336 | A1* | 3/2022 | Todd | G06Q 30/018 |
| 2022/0129555 | A1* | 4/2022 | Todd | G06F 16/24568 |
| 2023/0004913 | A1* | 1/2023 | Reineke | G06Q 10/06393 |
| 2023/0267114 | A1* | 8/2023 | Reineke | G06F 16/215<br>707/694 |
| 2023/0267194 | A1* | 8/2023 | Reineke | G06F 21/64<br>726/22 |
| 2025/0165443 | A1* | 5/2025 | Nowak | G06F 16/215 |
| 2025/0328516 | A1* | 10/2025 | Pande | G06F 16/2365 |
| 2026/0023737 | A1* | 1/2026 | Pande | G06F 16/2365 |

* cited by examiner

DCF-DRIVEN AUDIT AND COMPLIANCE REPORTING

TECHNOLOGICAL FIELD OF THE DISCLOSURE

Embodiments disclosed herein generally relate to data handling and management in edge environments. More particularly, at least some embodiments relate to systems, hardware, software, computer-readable media, and methods, for using data confidence scores assigned by a DCF-enabled (data confidence fabric) edge environment in assessing, and reporting on, edge compliance with regulatory and/or other requirements.

BACKGROUND

Edge environments often need to adhere to strict regulatory requirements, which can require frequent audits and compliance reporting. Traditional audit and reporting processes may not consider the varying data confidence levels of data moving in and through the edge environment, leading to insufficient or incorrect compliance measurements, and inaccurate reporting.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
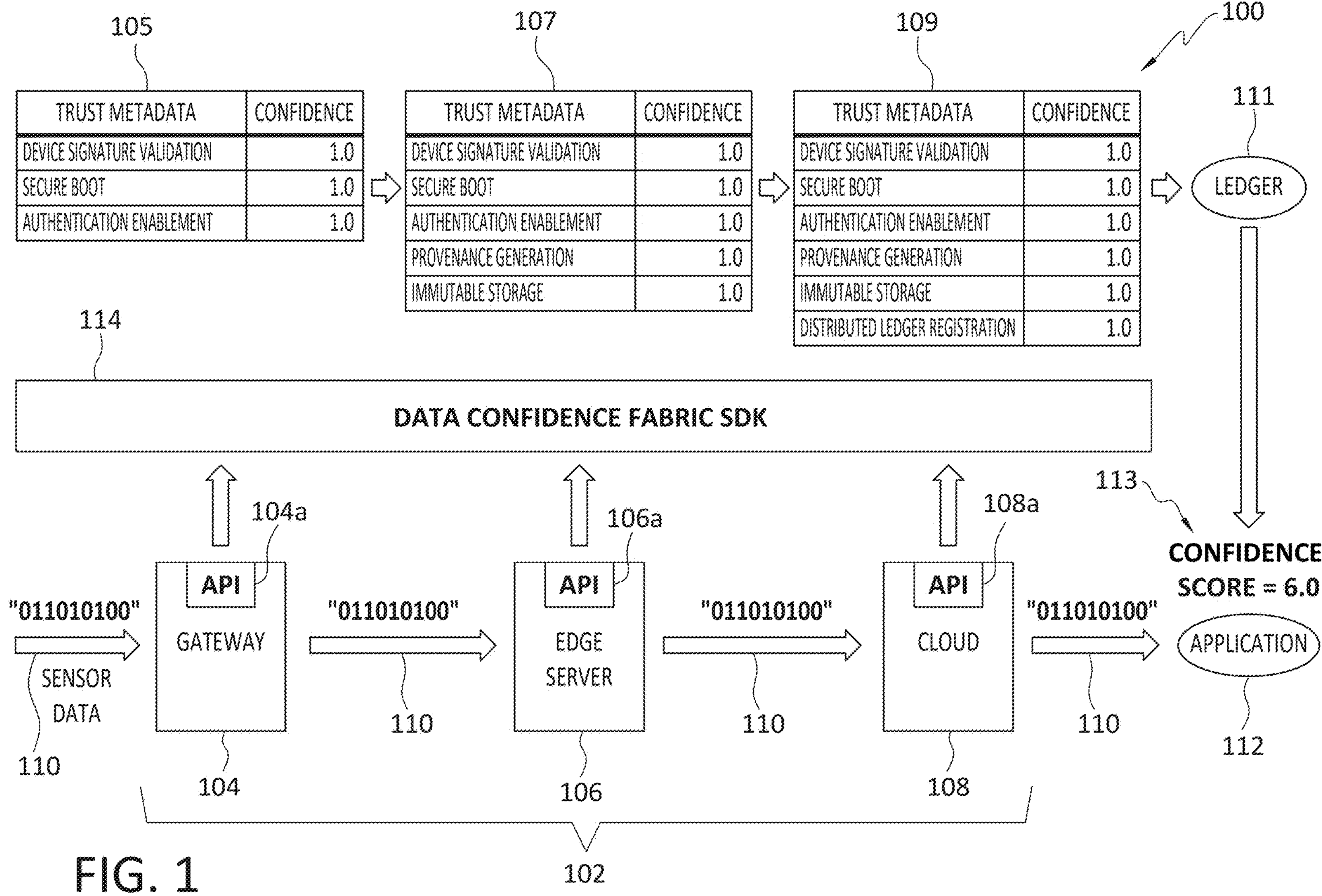
FIG. 1 discloses aspects of a DCF (data confidence fabric) in connection with which an embodiment may implemented.

Embodiments disclosed herein generally relate to data handling and management in edge environments. More particularly, at least some embodiments relate to systems, hardware, software, computer-readable media, and methods, for using data confidence scores assigned by a DCF-enabled (data confidence fabric) edge environment in assessing, and reporting on, edge compliance with regulatory and/or other requirements.

An example embodiment includes a method for using data confidence scores regarding edge devices and edge device operations to assess regulatory and/or other compliance in an edge environment. An outcome of an assessment may be used in a reporting process regarding the compliance. One example of such a method may comprise the operations: receiving a data stream from a data source; based on a configuration and/or operation of an edge device from which the data stream is received, generating and maintaining one or more data confidence scores for that edge device; assessing, based in part on the data confidence score, a compliance level of the edge device and/or the edge environment; reporting the compliance level; and, based in part on the compliance level, modifying a configuration and/or operation of the edge environment to improve the compliance level.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that compliance assessments of an edge environment may take into account data confidence scores generated for entities in the edge environment. An embodiment may provide deeper insights into the operations of an edge environment and edge entities than an approach that does not generate or consider data confidence scores. An embodiment may implement more accurate and complete, relative to conventional approaches, assessments of edge environment compliance with various requirements. Various other advantages of one or more example embodiments will be apparent from this disclosure.

A. Aspects of an Example DCF (Data Confidence Fabric)

The following is a discussion of aspects of an example DCF in connection with which an embodiment may be implemented. This discussion is not intended to limit the scope of the disclosure or claims, or the applicability of the embodiments, in any way.

In general, embodiments may be implemented in connection with systems, software, and components, that individually and/or collectively form computing environments, such as edge computing environments for example. One or more embodiments may be employed in computing environments that comprise, or implement, a portion of a data confidence fabric (DCF).

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

In general, a DCF may include various nodes, which may comprise hardware and/or software, through which the data passes as the data moves through the DCF. In an embodiment, one or more of the nodes may comprise a respective edge entity that may comprise hardware and/or software. Trust information, and confidence information such as data confidence scores, or simply 'confidence scores,' concerning the data may be inserted at one or more of these nodes as the data transits the DCF. The trust information may indicate, for example, a relative extent to which the data may be considered trustworthy by a user of the data, such as an application for example. The confidence information may indicate a relative level of confidence in the trustworthiness of the data.

Thus, if data passes through a node that is considered untrustworthy, or at least not fully trustworthy, for some reason, the confidence in the integrity and reliability of that data may be relatively low. That is, the trust information may be a function of, for example, the nature and operation of the node(s) through which the data passes. To illustrate, if a node that handles the data is determined to have inadequate security controls, data that has passed through that node may be assessed as relatively untrustworthy and the confidence in that data may be correspondingly low. Thus, an application that may have a need for the data may consider the confidence level, or confidence score, of the data in determining whether or not to use that data.

Turning now to FIG. 1, details are provided concerning an example DCF Annotation and Scoring Framework, or simply DCF, 100 in connection with which an embodiment may be employed. As shown, the DCF 100 may include various nodes 102, examples of which may include a gateway 104, an edge server 106, and a cloud site 108, through which data 110 may pass. The data 110 may ultimately be used, or consumed, by an end user 112, such as an application for example.

In an embodiment, the data 110 may be generated by a node such as a sensor, which may comprise an IoT (Internet of Things) edge device for example. Each of the nodes 102 may comprise a respective API 104*a*, 106*a*, and 108*a*, that the nodes 102 may use to communicate confidence information to a DCF SDK (software development kit) 112.

Consider, in the example of FIG. 1, the layers of trust that may be provided in the DCF 100. Particularly, the gateway 104 may have an embedded Intel TPM chip and it may use that chip to perform "trust services" on behalf of the owner of the data 110. In the example above, a "secure boot" annotation, in the trust metadata 105 for the gateway 104, may indicate that the gateway 104 has not been tampered with. The TPM chip may also provide keys used to perform signature services on the data 110. As well, in the example of FIG. 1, the edge server 106 may leverage an ARM secure enclave to perform a "trust service," inspecting the data 110 and performing analytics on it. Finally, a cloud application, such as the Dell Streaming Data Platform running at the cloud site 108, may perform additional trust services on the data 110 such as, for example, inspect the data 110 for drift, as may be done if the data is coming from a sensor with a well-known range of values and/or a long history of stable behavior.

As further indicated in FIG. 1, trust metadata generated at each state of the data 110 journey may be added to trust metadata generated at upstream nodes. Thus, for example, the trust metadata 105 may have been generated at the gateway 104, and the trust metadata 107 may include both the trust metadata 105 and trust metadata generated at the edge server 106. Finally, the trust metadata 109 may include trust metadata generated at the cloud site 108, as well as the trust metadata generated at the edge server 106, and at the gateway 104.

The accumulated trust metadata 109 may be stored in an immutable ledger 111 that may be accessible by the application 112. Additionally, or alternatively, a confidence score 113 may be generated based on the trust metadata 109, and made available to the application 112 or other data 110 end user(s).

The recipient, that is, the data owner, of these trust services that insert trust metadata may require this level of trust insertion in order that their applications, such as the application 112 for example, can produce insights from the data 110 with confidence that the data 110 is trustworthy. The trust insertion functionality may be of great value because it may significantly reduce the risk of dangerous actuation or other business logic resulting from low-quality, erroneous, or malicious data. By identifying compliance levels in an edge environment, trust services may also identify, and significantly reduce, the risk of regulatory compliance violations. Preventing these violations may enable trust service recipients to avoid regulatory fines. One or more embodiments may enable the vendors providing these trust/confidence services to accurately track the provision of these services in a DCF, and an embodiment may also enable the vendor to bill the data owner, and/or other trust service consumers. Details concerning some example functionalities that may be provided by an embodiment are set forth in the following section.

B. Aspects of an Example Architecture and Operations According to One Embodiment With attention now to FIG. 2, an example architecture, and associated operations, according to one embodiment are disclosed. As shown there, the example architecture 200 may comprise one or more data sources 202, such as edge entities for example. Any of the data sources 202 may comprise, for example, IoT (internet of things) devices, sensors, user inputs, autonomous vehicles, and/or any other entity(s), any of which may comprise hardware and/or software, that is/are operable to collect and/or generate data. A data source 202 may also be a data consumer, that is, the data source 202 may receive data from one or more other data sources 202, and may process, store, and/or transmit, that data.

In an embodiment, the data sources 202 may comprise respective nodes of a data confidence-enabled edge environment 204, that is, a data confidence fabric (DCF), a further example of which is disclosed in FIG. 1, discussed above. In embodiment, the DCF 204 may generate and maintain data confidence scores for some, or all, data streams transiting the DCF 204. To this end, the DCF 204 may comprise, and/or access, confidence score generations algorithms that account for data source 202 parameters such as, but not limited to, reliability, accuracy, and recency of data.

The DCF 204 may comprise, or interact with, an audit and compliance reporting system (ACRS) 206. The ACRS 206 may receive confidence scores from the DCF 204. The ACRS 206 may use the confidence scores to assess compliance, such as regulatory compliance for example, of the edge environment, including the data sources 202 in the edge environment. As such, the ACRS 206 may comprise, or receive from an auditor and/or other source(s), information that identifies regulatory, and/or other, requirements with which the edge environment must comply.

Regulatory and other requirements concerning handling of the data in an edge environment may specify, for example, if/how data may be read, written, deleted, copied, modified, stored, received, and transmitted, by an entity of the edge environment. Such requirements may specific security and handling requirements based on data sensitivity. For example, publicly available data may not be subjected to access controls, while private or confidential data may be subjected to access controls.

In addition to using confidence scores to assess edge environment, and edge entity, compliance, the ACRS 206 may generate various reports 208, such as audit reports, based on its assessment of the edge environment. An audit report may indicate, for example, an extent to which the edge environment, and/or its constituent edge entities, are in, or out of, compliance with the applicable requirements and standards. The level of compliance may be expressed numerically, such as 90% for example, or in some other manner.

Inasmuch as they may be based, at least in part, on confidence scores generated by the DCF 204, the reports generated by the ACRS 206 may provide, relative to conventional approaches that do not consider data confidences, a relatively more accurate reflection of the extent to which the edge environment is in compliance, or not, with applicable regulations and other standards. A report 208 generated by the ACRS 206 may identify specific data sources 202, and/or data paths, in the DCF 204, that are problematic so that those data sources 202 and data paths may be targeted for remedial actions which may also be identified in the report 208. In an embodiment, remedial actions may be identified by troubleshooting the data source 202 to identify the specific reason(s) for the low confidence score associated with that data source 202. Examples of such remedial actions include, but are not limited to, upgrading the security of the data source 202 by implementing hardware and/or software changes in the data source 202, changing a data path in the DCF 204 to avoid, or reduce the use of, the data source 202, and removing the data source 202 from the DCF 204.

In an embodiment, the report 208 may include confidence levels associated with data transiting the DCF 204. The confidence levels, indicated by confidence scores for example, may provide a deeper and more accurate understanding of the extent to which the data sources 202, and/or other elements, of the edge environment comply, or fail to comply, with regulatory requirements and/or other requirements applicable to the edge environment. In an embodiment, this compliance information may be reported to a regulatory authority and/or other entities. An entity, such as a business enterprise, that owns and controls the DCF 204 may be subject to fines and other penalties if the edge environment fails to meet compliance standards. Thus, an embodiment may help reduce the exposure of a business enterprise to such fines and penalties.

In an embodiment, the compliance information of the report 208 may enable improved decision-making and risk management with respect to operations of the DCF 204 and data sources 202. For example, if a particular type of data source 202, or particular data source 202, is determined to be problematic, as reflected in a confidence score for example, that data source 202 may be removed and replaced. As another example, and noted earlier herein, the DCF 204 may be reconfigured so that some or all data, such as highly sensitive PII (personally identifiable information) data or trade secrets for example, bypasses any problematic data sources 202. Consumers, such as applications for example, of data known, by virtue of confidences scores, to present a risk, may be notified as to whether, when, and how, such data may be safely used.

In contrast, a conventional approach that fails to take account of data confidence may have only a vague understanding and awareness, if any at all, as to whether an edge environment is in compliance with applicable requirements. Such a conventional approach would likewise fail to possess a useful understanding or awareness as to the connection between specific problematic data sources and data, and the overall lack of compliance by the edge environment.

C. Example Use Case

Embodiments may be employed in a wide variety of circumstances and contexts. Thus, the following use case is presented by way of illustration, and is not intended to limit the scope of the disclosure or claims in any way. Consider a financial institution that utilizes edge computing systems with strict regulatory requirements related to data processing and storage. A DCF-driven audit and compliance reporting system, according to one embodiment, takes data confidence scores into account, ensuring more accurate compliance measurements and reducing the chances of non-compliance penalties.

D. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
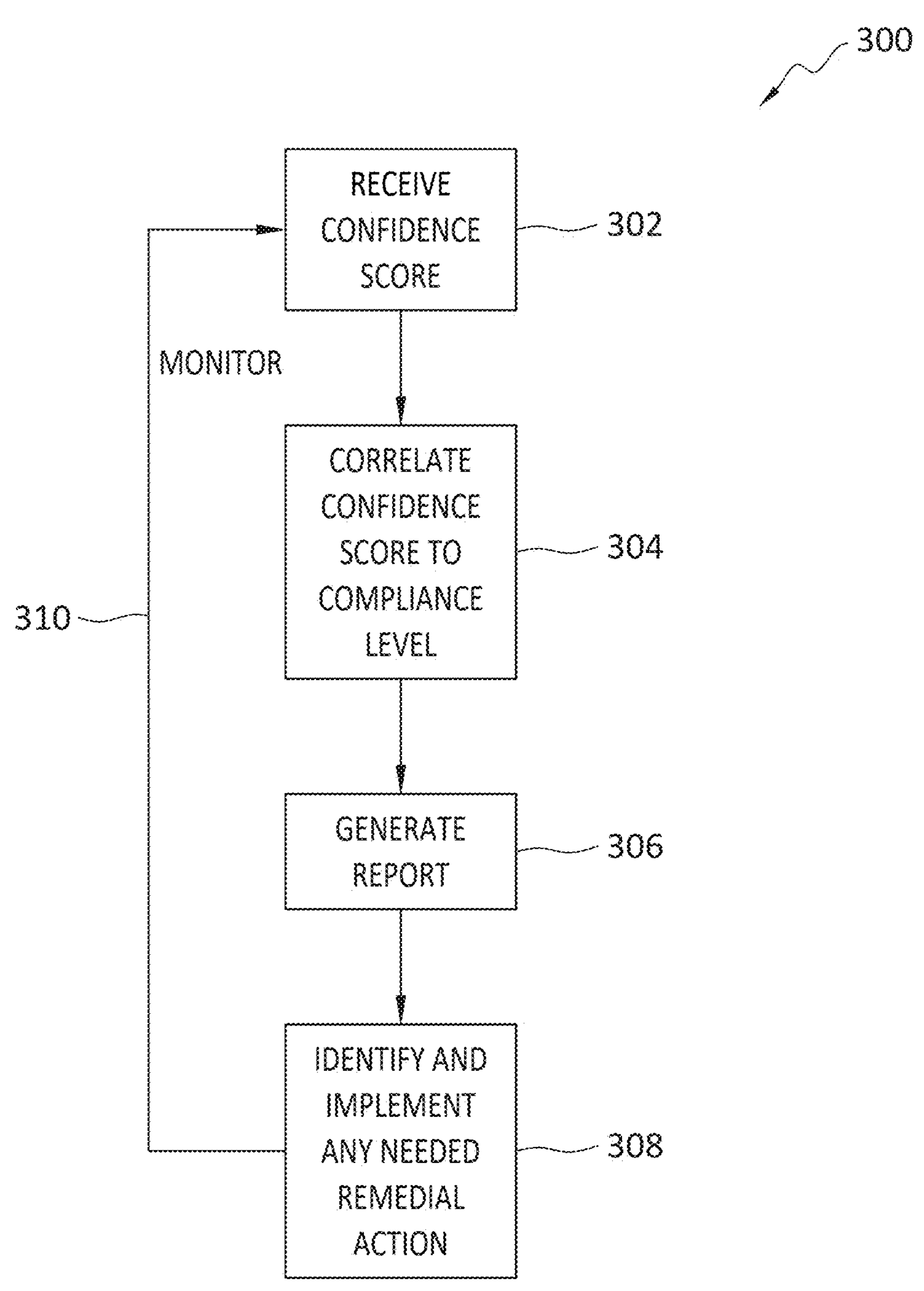
FIG. 3 discloses a method according to one embodiment.

Directing attention now to FIG. 3, an example method 300 according to one embodiment is disclosed. In an embodiment, part or all of the method 300 may be performed by an ACRS, either acting alone or in concert with one or more elements of a DCF. In an embodiment, an ACRS may be an element that is integrated into a DCF, or the ACRS may operate as a stand-alone platform operable to communicate with a DCF. In an embodiment, an ACRS may be integrated into an auditor site, or a site of a regulatory agency. The method 300 may be performed on an ongoing basis, and/or on an ad hoc basis such as when a change occurs to an applicable regulation or requirement concerning handling of data in an edge environment.

The example method 300 may begin when an ACRS, for example, receives 302 a confidence score concerning a data stream handled by an entity, such as a data source for example, of an edge environment. As the edge entity may comprise a node of a DCF, the confidence score may be generated by the DCF.

The confidence score may then be correlated 304 with a compliance level of the edge environment. For example, a relatively high confidence score such as 9/10 may indicate that the edge environment is sufficiently, or fully, compliant with regulation or requirement applicable to an aspect of the edge environment, such as the way in which the edge environment handles data. On the other hand, a relatively low confidence score such as 2/10 may indicate that the edge environment fails to comply with an applicable regulation or requirement. In an embodiment, the level of compliance may be specified on a scale, such as from 1 to 10 for example, where, for example, a compliance level of 8 or greater is acceptable. In an embodiment, the level of compliance may be binary, that is, depending on the confidence score, the edge environment may be deemed either compliant (value of 1), or not (value of 0).

After the confidence score has been correlated 304 to the compliance level of the edge environment, a report may be generated 306 that that identifies a connection between the confidence score and the compliance. For example, the report may map a confidence score of 2 of a data source to an assessment of 'non-compliance.' This correlation or mapping may thus identify problematic entities in the edge environment as being the source or cause of non-compliance.

Based on the findings included in a report, one or more remedial actions may then be identified and implemented 308. Such remedial actions may include, for example, changing the hardware and/or software in an edge entity of the edge environment. Another example remedial action may comprise simply bypassing a problematic edge entity when sensitive data is transiting the edge environment. More generally, a remedial action may be an action which, when implemented, brings the edge environment, or a specific edge entity, into compliance with an applicable regulation or standard that constrains the handling of data.

Finally, the method 300 may comprise ongoing monitoring 310 to ensure that the edge environment is in compliance, and maintains compliance, with any applicable regulations and requirements. In an embodiment, the monitoring 310 may be performed, possibly automatically, ad hoc in response to a change in an applicable regulation or requirement concerning data handling in the edge environment. The change may be received from an auditor, or regulatory body, for example.

E. Further Example Embodiments

Following are some further example embodiments. These are presented only by way of example and are not intended to limit the scope of this disclosure or the claims in any way.

Embodiment 1. A method, comprising: receiving, from a DCF (data confidence fabric) including a node that comprises a data source of an edge environment, a confidence score concerning a data stream associated with the data source; correlating the confidence score to a compliance level of the edge environment with regard to a specified requirement for the edge environment; generating, based on the confidence score and compliance information, an audit report that identifies a connection between the confidence score and the compliance level; and for a value of a performance gap between the compliance level and a required compliance level, associated with the specified requirement, that meets or exceeds a threshold, identifying a remedial action which, when implemented in the edge environment, causes a reduction of the performance gap to a value below the threshold.

Embodiment 2. The method as recited in any preceding embodiment wherein the data source comprises hardware and/or software.

Embodiment 3. The method as recited in any preceding embodiment, wherein the specified requirement is determined by a regulatory agency.

Embodiment 4. The method as recited in any preceding embodiment, wherein the confidence score concerns performance of hardware and/or software of the data source.

Embodiment 5. The method as recited in any preceding embodiment, wherein the data stream was generated and/or handled by the data source.

Embodiment 6. The method as recited in any preceding embodiment, wherein the remedial action comprises receipt, by the edge environment, of a change to hardware and/or software of the edge environment.

Embodiment 7. The method as recited in any preceding embodiment, wherein implementation of the remedial action brings the edge environment into compliance with the specified requirement.

Embodiment 8. The method as recited in any preceding embodiment, wherein the specified requirement indicates how the data stream should be handled by entities in the edge environment.

Embodiment 9. The method as recited in any preceding embodiment, wherein the data stream was generated by the data source.

Embodiment 10. The method as recited in any preceding embodiment, wherein the edge environment is monitored on an ongoing and/or ad hoc basis for compliance of the edge environment with the specified requirement.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 2:
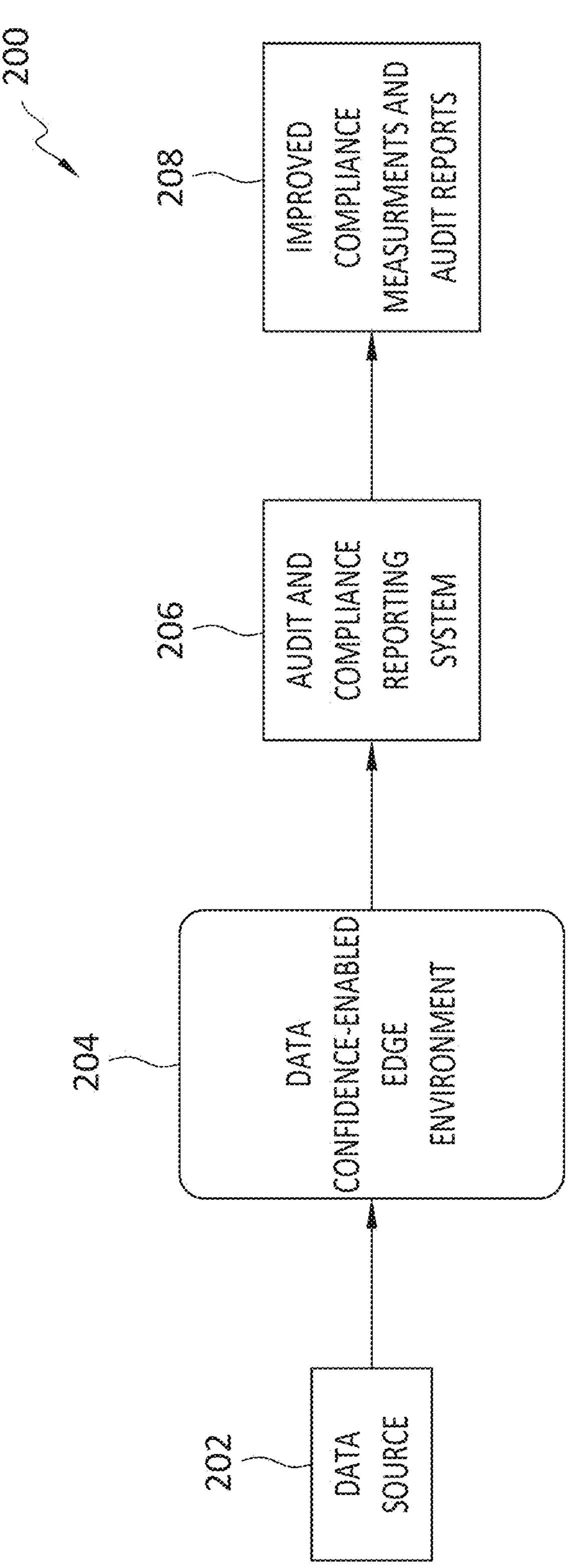
FIG. 2 discloses aspects of an architecture according to one embodiment.
Figure 4:
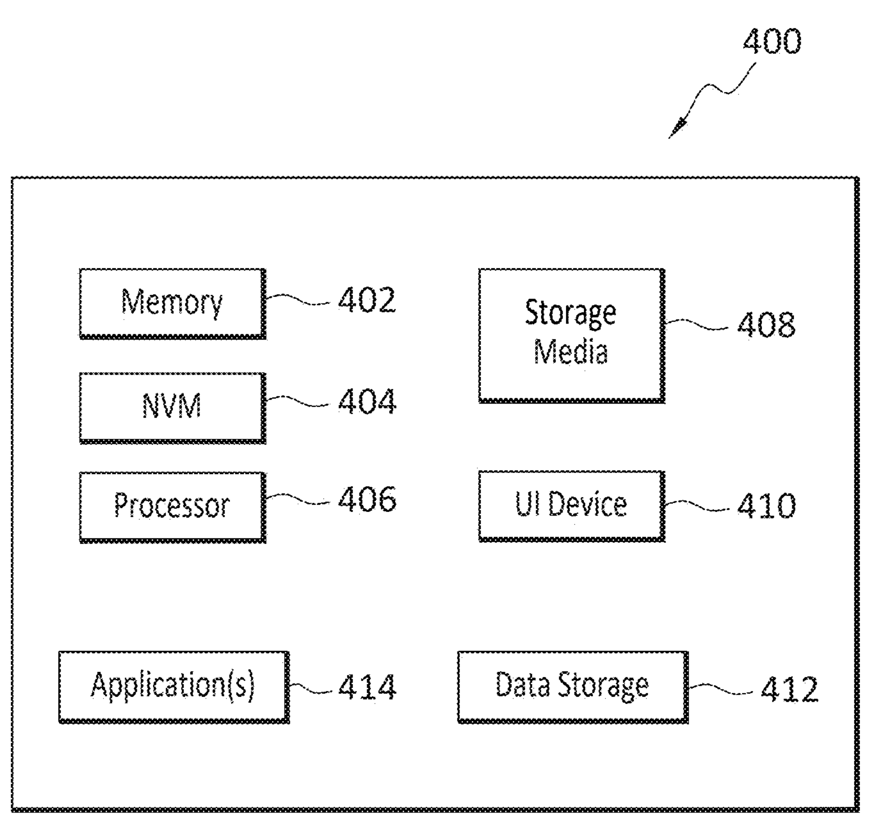
FIG. 4 discloses a computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method concerning data handling compliance in an edge environment, comprising:

receiving, from a DCF (data confidence fabric) including a node that comprises a data source of an edge environment and a secure hardware, a confidence score concerning a data stream associated with the data source, the confidence score being generated by the secure hardware based on accumulated trust metadata, the accumulated trust metadata comprising at least a secure-boot annotation, a device attestation signature, provenance metadata, and an indication of authentication enablement, the accumulated trust metadata being stored in an immutable ledger accessible to the edge environment;

correlating, by the secure hardware, the confidence score to a compliance level of the edge environment with regard to a specified requirement for the edge environment;

generating, based on the confidence score and compliance information, an audit report that identifies a connection between the confidence score and the compliance level and that identifies, from the accumulated trust metadata, one or more diagnosed trust factor(s) that cause a lower confidence score, and that maps a confidence score of the data source to an assessment of non-compliance; and for a value of a performance gap between the compliance level and a required compliance level, associated with the specified requirement, that meets or exceeds a threshold, identifying a remedial action which, when implemented in the edge environment, causes a reduction of the performance gap to a value below the threshold, the remedial action being selected by the secure hardware based on the diagnosed trust factor(s) identified from the accumulated trust metadata, and the remedial action comprising one or more of: revoking or re-provisioning keys provided by the secure hardware, performing a firmware update of the data source, reconfiguring a data path in the DCF to avoid or reduce use of the data source, or removing the data source from the DCF, and implementation of the remedial action being effected by issuing the remediation command(s) from the secure hardware to the affected node(s) so that the confidence score for the data source is increased and the performance gap is reduced below the threshold, wherein the secure hardware includes a trust platform module (TPM) chip or an advanced reduced instruction set computing (RISC) machine (ARM) secure enclave, and wherein the secure hardware provides keys used to perform signature service on the data source.

2. The method as recited in claim 1 wherein the data source comprises hardware and/or software.

3. The method as recited in claim 1, wherein the specified requirement is determined by a regulatory agency.

4. The method as recited in claim 1, wherein the confidence score concerns performance of hardware and/or software of the data source.

5. The method as recited in claim 1, wherein the data stream was generated and/or handled by the data source.

6. The method as recited in claim 1, wherein the remedial action comprises receipt, by the edge environment, of a change to hardware and/or software of the edge environment.

7. The method as recited in claim 1, wherein implementation of the remedial action brings the edge environment into compliance with the specified requirement.

8. The method as recited in claim 1, wherein the specified requirement indicates how the data stream should be handled by entities in the edge environment.

9. The method as recited in claim 1, wherein the data stream was generated by the data source.

10. The method as recited in claim 1, wherein the edge environment is monitored on an ongoing and/or ad hoc basis for compliance of the edge environment with the specified requirement.

11. A non-transitory storage medium having stored therein instructions that are executable by one or more hardware processors to perform operations comprising:

receiving, from a DCF (data confidence fabric) including a node that comprises a data source of an edge environment and a secure hardware, a confidence score concerning a data stream associated with the data source, the confidence score being generated by the secure hardware based on accumulated trust metadata, the accumulated trust metadata comprising at least a secure-boot annotation, a device attestation signature, provenance metadata, and an indication of authentication enablement, the accumulated trust metadata being stored in an immutable ledger accessible to the edge environment;

correlating, by the secure hardware, the confidence score to a compliance level of the edge environment with regard to a specified requirement for the edge environment;

generating, based on the confidence score and compliance information, an audit report that identifies a connection between the confidence score and the compliance level and that identifies, from the accumulated trust metadata, one or more diagnosed trust factor(s) that cause a lower confidence score, and that maps a confidence score of the data source to an assessment of non-compliance; and for a value of a performance gap between the compliance level and a required compliance level, associated with the specified requirement, that meets or exceeds a threshold, identifying a remedial action which, when implemented in the edge environment, causes a reduction of the performance gap to a value below the threshold, the remedial action being selected by the secure hardware based on the diagnosed trust factor(s) identified from the accumulated trust metadata, and the remedial action comprising one or more of: revoking or re-provisioning keys provided by the secure hardware, performing a firmware update of the data source, reconfiguring a data path in the DCF to avoid or reduce use of the data source, or removing the data source from the DCF, and implementation of the remedial action being effected by issuing the remediation command(s) from the secure hardware to the affected node(s) so that the confidence score for the data source is increased and the performance gap is reduced below the threshold, wherein the secure hardware includes a trust platform module (TPM) chip or an advanced reduced instruction set computing (RISC) machine (ARM) secure enclave, and wherein the secure hardware provides keys used to perform signature service on the data source.

12. The non-transitory storage medium as recited in claim 11 wherein the data source comprises hardware and/or software.

13. The non-transitory storage medium as recited in claim 11, wherein the specified requirement is determined by a regulatory agency.

14. The non-transitory storage medium as recited in claim 11, wherein the confidence score concerns performance of hardware and/or software of the data source.

15. The non-transitory storage medium as recited in claim 11, wherein the data stream was generated and/or handled by the data source.

16. The non-transitory storage medium as recited in claim 11, wherein the remedial action comprises receipt, by the edge environment, of a change to hardware and/or software of the edge environment.

17. The non-transitory storage medium as recited in claim 11, wherein implementation of the remedial action brings the edge environment into compliance with the specified requirement.

18. The non-transitory storage medium as recited in claim 11, wherein the specified requirement indicates how the data stream should be handled by entities in the edge environment.

19. The non-transitory storage medium as recited in claim 11, wherein the data stream was generated by the data source.

20. The non-transitory storage medium as recited in claim 11, wherein the edge environment is monitored on an ongoing and/or ad hoc basis for compliance of the edge environment with the specified requirement.

* * * * *